United States Patent
Yu

(10) Patent No.: US 12,290,757 B2
(45) Date of Patent: May 6, 2025

(54) SUPPLEMENTAL CASTING CONTROL WITH DIRECTION AND MAGNITUDE

(71) Applicant: Tencent Technology (Shenzhen) Company Limited, Shenzhen (CN)

(72) Inventor: Yao Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/314,299

(22) Filed: May 9, 2023

(65) Prior Publication Data

US 2023/0271091 A1  Aug. 31, 2023

Related U.S. Application Data

(63) Continuation of application No. 17/156,087, filed on Jan. 22, 2021, now Pat. No. 11,684,858, and a (Continued)

(30) Foreign Application Priority Data

Sep. 4, 2019  (CN) .......................... 201910833875.2

(51) Int. Cl.
  *A63F 13/798* (2014.01)
  *A63F 13/2145* (2014.01)
  (Continued)

(52) U.S. Cl.
  CPC ........ *A63F 13/798* (2014.09); *A63F 13/2145* (2014.09); *A63F 13/42* (2014.09); *G06F 3/04886* (2013.01); *A63F 2300/1075* (2013.01)

(58) Field of Classification Search
  CPC .... A63F 13/2145; A63F 13/42; A63F 13/426; A63F 13/45; A63F 13/533;
  (Continued)

(56) References Cited

U.S. PATENT DOCUMENTS

| | | |
|---|---|---|
| 2011/0285636 A1 | 11/2011 | Howard et al. |
| 2014/0302900 A1 | 10/2014 | Lee et al. |
| 2018/0024660 A1* | 1/2018 | Wang .................. G06F 3/04817 273/110 |

FOREIGN PATENT DOCUMENTS

| | | |
|---|---|---|
| CN | 106033340 A | 10/2016 |
| CN | 107168611 A | 9/2017 |

(Continued)

OTHER PUBLICATIONS

Office Action received in Indonesian Patent Application No. P00202107131 dated Aug. 11, 2023 (2 pages); and reporting letter from Indonesian associate dated Aug. 14, 2023 (2 pages).
(Continued)

*Primary Examiner* — Lawrence S Galka
(74) *Attorney, Agent, or Firm* — Crowell & Moring LLP

(57) ABSTRACT

An information exchange method and a related apparatus include a game picture that may be displayed that includes a candidate skill region, a target skill determined based on a skill selection operation for the candidate skill region, a virtual joystick object displayed on the game picture, and when a movement operation for the virtual joystick object is detected, at least one skill generation position of the target skill is calculated based on the movement operation. A skill effect model of the target skill is generated at the at least one skill generation position when a cast operation for the virtual joystick object is detected. A user may control a plurality of skill effect model generation positions of a game skill through the virtual joystick object, so that precision of information exchange can be improved.

20 Claims, 5 Drawing Sheets

Related U.S. Application Data continuation of application No. PCT/CN2020/110199, filed on Aug. 20, 2020.

(51) Int. Cl.
  *A63F 13/42*     (2014.01)
  *G06F 3/04886*   (2022.01)

(58) Field of Classification Search
  CPC .... A63F 13/5372; A63F 13/58; A63F 13/798; A63F 13/822; A63F 13/92; A63F 2300/1075; G06F 3/0338; G06F 3/038; G06F 3/04833; G06F 3/04886
  See application file for complete search history.

(56) References Cited

FOREIGN PATENT DOCUMENTS

| | | |
|---|---|---|
| CN | 108509139 A | 9/2018 |
| CN | 108771869 A | 11/2018 |
| CN | 109550241 A | 4/2019 |
| CN | 109568938 A | 4/2019 |
| CN | 110559658 A | 12/2019 |
| EP | 3 264 248 A1 | 1/2018 |
| KR | 10-2018-0111397 | 10/2018 |
| WO | WO 2021/043000 A1 | 3/2021 |

OTHER PUBLICATIONS

International Search Report and Written Opinion received for Application No. PCT/CN2020/110199 mailed Nov. 25, 2020 (English and Chinese languages), (10 pages).
Search Report from the State Intellectual Property Office for China Application No. 201910833875.2 posted May 6, 2020 (12 pages).
Extended European Search Report for EP Application No. 20861591.4 dated Apr. 26, 2022 (English and Japanese languages) (8 pages).
Examination Report for India Patent Application No. 202147039006 dated Dec. 8, 2022 (5 pages).
Singapore Office Action dated Jan. 4, 2023, pp. 1-7, issued in Singapore Patent Application No. 11202108571 LV, Intellecutal Property Office of Singapore, Singapore.
India Office Action dated Dec. 8, 2022, pp. 1-5, issued in India Patent Application No. 202147039006, Intellectual Property India, Chennai, India.

* cited by examiner

SUPPLEMENTAL CASTING CONTROL WITH DIRECTION AND MAGNITUDE

RELATED APPLICATION

This application is a continuation of U.S. patent application Ser. No. 17/156,087, filed Jan. 22, 2021, which is a continuation application of PCT Patent Application No. PCT/CN2020/110199 filed Aug. 20, 2020, which claims priority to Chinese Patent Application No. 201910833875.2, entitled "INFORMATION EXCHANGE METHOD AND APPARATUS, TERMINAL, AND STORAGE MEDIUM" and filed on Sep. 4, 2019, all of which are incorporated herein by reference in their entirety.

FIELD OF THE TECHNOLOGY

This application relates to the field of computers, and specifically, to information exchange.

BACKGROUND OF THE DISCLOSURE

Game skills may achieve specific effects for specific characters, objects, and regions in a game at a specific time when meeting a certain game condition. A user may cast various game skills in a virtual scene by controlling a virtual role in a game through a client.

As touch screens b, a player may perform man-machine interaction by using fingers or another object to touch the display screen, to control a virtual role in a game to cast game skills.

SUMMARY

Embodiments of this application provide an information exchange method and a related apparatus, so that precision of information exchange can be improved.

An embodiment of this application provides an information exchange method, performed by a terminal, the method including:
  displaying a game picture, the game picture including a candidate skill region;
  determining a target skill based on a skill selection operation for the candidate skill region;
  displaying a virtual joystick object on the game picture;
  calculating, when a movement operation for the virtual joystick object is detected, at least one skill generation position of the target skill based on the movement operation; and
  generating a skill effect model of the target skill at the at least one skill generation position when a cast operation for the virtual joystick object is detected.

Another embodiment of this application further provides an information exchange apparatus, including:
  a picture unit, configured to display a game picture, the game picture including a candidate skill region;
  a skill unit, configured to determine a target skill based on a skill selection operation for the candidate skill region;
  a joystick unit, configured to display a virtual joystick object on the game picture;
  a position unit, configured to calculate, when a movement operation for the virtual joystick object is detected, at least one skill generation position of the target skill based on the movement operation; and
  a generation unit, configured to generate a skill effect model of the target skill at the at least one skill generation position when a cast operation for the virtual joystick object is detected.

Another embodiment of this application further provides a storage medium, the storage medium being configured to store a computer program, the computer program being configured to perform the information exchange method according to other embodiments.

Another embodiment of this application further provides a terminal, including a processor and a memory, the memory storing a plurality of instructions, and the processor loading the instructions from the memory and executing those instructions to perform the information exchange method according to the above aspect.

Another embodiment of this application further provides a computer program product including instructions, the computer program product, when run on a computer, causing the computer to perform the information exchange method according to other embodiments.

According to some embodiments of this application, a game picture may be displayed, the game picture including a candidate skill region; a target skill is determined based on a skill selection operation for the candidate skill region; a virtual joystick object is displayed on the game picture; when a movement operation for the virtual joystick object is detected, at least one skill generation position of the target skill is calculated based on the movement operation; and a skill effect model of the target skill is generated at the at least one skill generation position when a cast operation for the virtual joystick object is detected.

In this application, a user may control and adjust a plurality of skill effect model generation positions of a game skill through the virtual joystick object in the game picture, so that precision of information exchange can be improved through the solution.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in the embodiments of this application are clearly and completely described in the following with reference to the accompanying drawings in the embodiments of this application. The described embodiments are merely exemplary of this application rather than a description of every one of the embodiments. A person skilled in the art would recognize other embodiments, based on the embodiments described in this application and those other embodiments fall within the protection scope of this application.

The embodiments of this application provide an information exchange method and a related apparatus.

The information exchange apparatus may be integrated in a terminal in one embodiment. The terminal may be a device such as a mobile phone, a tablet computer, an intelligent Bluetooth device, a notebook computer, a video game console, or a personal computer (PC) in some embodiments.

Figure 1A:
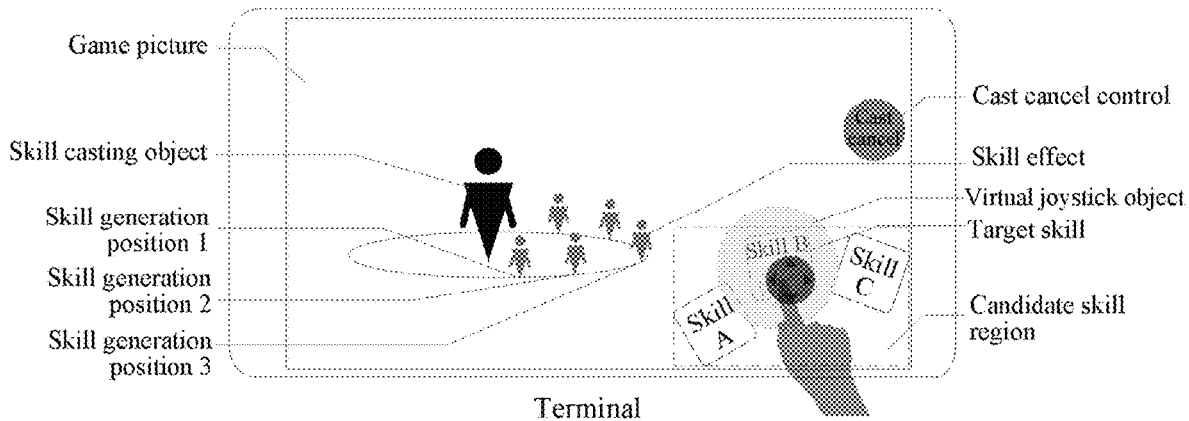
FIG. 1a is a schematic scenario diagram of an information exchange method according to an embodiment of this application.

Referring to FIG. 1a, the information exchange apparatus may be integrated in a smart phone in one example. The smart phone may be installed with game software, and the smart phone may run the game software. When the game software is run, the smart phone may display a game picture, where the game picture may include a candidate skill region; a target skill may be determined based on a skill selection operation performed by a user for the candidate skill region; a virtual joystick object is displayed on the game picture; when a movement operation for the virtual joystick object is detected, at least one skill generation position of the target skill is calculated based on the movement operation; and a skill effect model of the target skill is generated at the at least one skill generation position when a cast operation performed by a user for the virtual joystick object is detected.

Detailed descriptions are separately provided below. The sequence numbers of the following embodiments are not intended to be the only order of operations for each of the embodiments. Some embodiments may include fewer or more operations and those operations may be in a different order than the example embodiments shown herein.

Figure 1B:
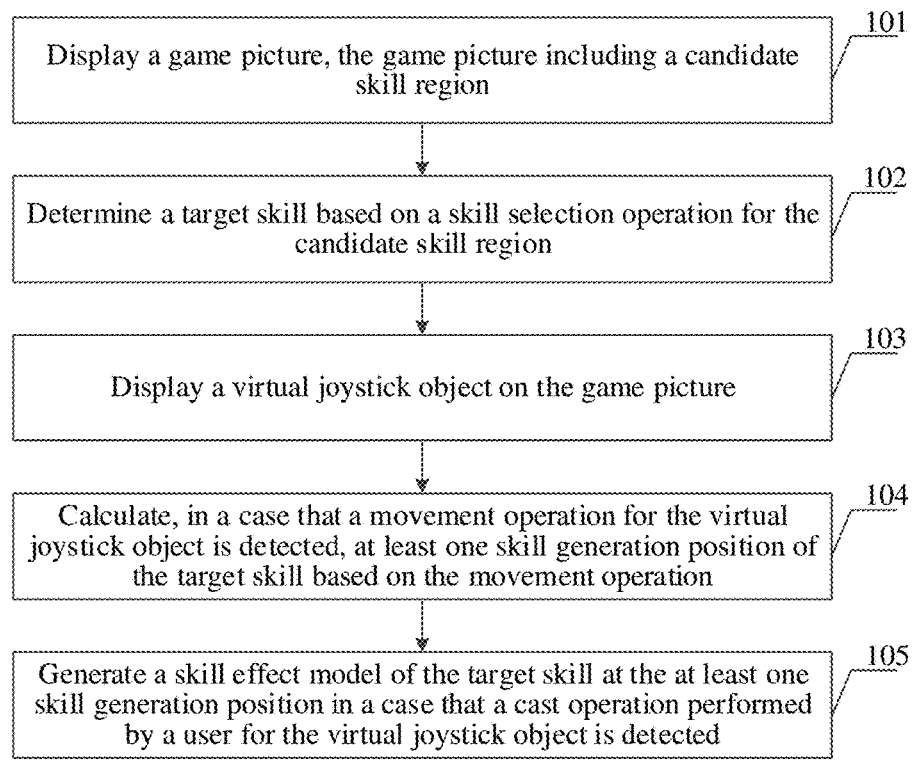
FIG. 1b is a schematic flowchart of an information exchange method according to an embodiment of this application.

In this embodiment, an information exchange method is provided. As shown in FIG. 1b, a specific process of the information exchange method may be as follows:

FIG. 1b, step 101: Display a game picture, the game picture including a candidate skill region.

The game picture may include a game scene picture and a user interface (UI) of game software, where the game scene picture may display content such as scenes and virtual roles in the game, and the UI may include game design elements that are in direct or indirect contact with game users, for example, game buttons, text, and windows.

A user may interact with game content through the game picture.

Referring to FIG. 1a, the game picture may include a candidate skill region. The candidate skill region may include skill information of at least one candidate skill, and the skill information may be information such as a skill name or a skill control.

The game skill may be a series of virtual events in a video game. When a certain condition is met, these virtual events may trigger specific effects at a specific time for specific characters, objects, and regions in the game.

Basic elements of the game skill include a trigger mechanism (when and how to start a life cycle of the skill) of the game skill, a skill event (describing atom information of the occurrence of the skill), and skill effects (causing changes to a current game environment). Specific skill effects of the game skill may be made by a person skilled in the art according to requirements.

Generally, the game skill may include an effect model and a numerical model of the game skill. The implementation of the game skill is to generate the effect model of the game skill in a game scene, and apply the numerical model to a corresponding target object, to achieve the skill effect.

There may be many types of effect models of the game skill, for example, a scene model, a building model, a character model, an animation model, and a particle effect model.

For example, in some embodiments, if a game effect of a game skill A is to summon five virtual followers around a skill casting object of the game skill A, the implementation of the game skill A is to generate five virtual follower models around a skill casting object model of the game skill A.

FIG. 1b, step 102: Determine a target skill based on a skill selection operation for the candidate skill region.

There are various operation manners of the skill selection operation performed by a user for the candidate skill region. For example, the user may select a skill in the candidate skill region through dragging, tapping, swiping, pressing, touching, or the like. In addition, the skill selection operation may alternatively be generated by simulating a user operation. For example, the skill selection operation is generated by simulating an operation for a specified position in the candidate skill region. In addition to the skill selection operation, other operations (such as a movement operation and a cast operation) mentioned in this application may alternatively be generated through simulation.

The candidate skill region may include skill information of at least one candidate skill, and the skill information may be a skill control. The control may be displayed as an icon, a symbol, a button, or the like. The target skill may be determined in these candidate skills through a skill selection operation performed by a user for the candidate skill region.

In some embodiments, to make skill cast more intuitive and optimize the skill cast in a multi-skill case, and to further improve precision of information exchange, the candidate skill region may include a skill control of at least one candidate skill. Therefore, step 102 may include the following step:

determining the target skill in the at least one candidate skill based on a selection operation for the skill control.

For example, the candidate skill region may include skill icons of a plurality of candidate skills. A user may select and tap one candidate skill from the skill icons of the plurality of candidate skills, that is, the candidate skill is determined as the target skill.

In another example, the candidate skill region may include a skill icon of a candidate skill. A user may swipe down the skill icon of the candidate skill in the candidate skill region, so that the candidate skill region switches to display a skill icon of a next candidate skill, and determines the next candidate skill as the target skill. Alternatively, a user may swipe up the skill icon of the candidate skill in the candidate skill region, so that the candidate skill region switches to display a skill icon of a previous candidate skill, and determines the previous candidate skill as the target skill.

FIG. 1b, step 103: Display a virtual joystick object on the game picture.

The virtual joystick object is a virtual component that may be used for man-machine interaction. A user may input information into a terminal by controlling movement changes of the virtual joystick object.

Figure 1C:
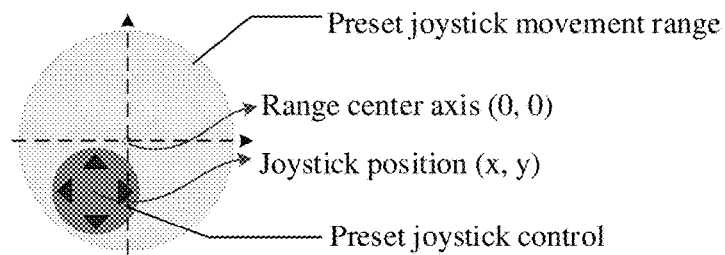
FIG. 1c is a schematic structural diagram of a virtual joystick object according to an embodiment of this application.

In some embodiments, referring to FIG. 1c, the virtual joystick object may include a preset joystick control, a preset joystick movement range, and a range center axis of the preset joystick movement range.

A user may control the preset joystick control to move freely in the preset joystick movement range. When the user controls the preset joystick control to move, a relative distance and direction between the preset joystick control and the range center axis of the preset joystick movement range may be used as user-inputted information for interaction with the game.

In some embodiments, step 103 may include the following step:

overlay-displaying the virtual joystick object on the skill control of the target skill.

Overlay-display refers to layering the virtual joystick object and the skill control, and displaying the virtual joystick object and the skill control after the virtual joystick object is located over the skill control.

Overlay may be full overlay, partial overlay, or the like.

Figure 1D:
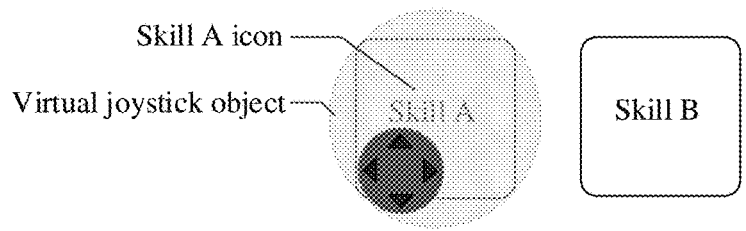
FIG. 1d is a schematic effect diagram of overlay-display according to an embodiment of this application.

For example, referring to FIG. 1d, when the target skill is a skill A, and a skill control of the skill A is presented as an icon, the virtual joystick object is overlay-displayed on the skill A icon of the target skill. That is, the virtual joystick object is layered on the skill A icon of the target skill, and the virtual joystick object and the skill A icon are displayed after the virtual joystick object is located over the skill A icon.

In some embodiments, to help a user to stop casting a game skill at any time, the game picture may further include a cast cancel control. Therefore, after step 103, the method may further include the following step:

stopping displaying the virtual joystick object in the game picture when a cast cancel operation for the cast cancel control is detected.

For example, referring to FIG. 1a, displaying of the virtual joystick object is stopped in the game picture in a case that the cast cancel operation for the cast cancel control is detected.

Further, in some embodiments, displaying of a skill preview effect model and a skill generation region of the target skill may further be stopped in the game picture when the cast cancel operation for the cast cancel control is detected. For a specific introduction of the skill preview effect model and the skill generation region, reference may be made to descriptions in step 104. Details are not described herein again.

FIG. 1b, step 104: Calculate, in a case that a movement operation for the virtual joystick object is detected, at least one skill generation position of the target skill based on the movement operation.

The user may move the virtual joystick control of the virtual joystick object by dragging, swiping, tapping, or the like.

The skill generation position refers to a position at which the skill effect model is actually generated in the game scene when the game skill is triggered. There may be one or more skill generation positions.

For example, when a skill X is triggered, two thunderclouds may be generated on the easternmost end and the westernmost end of the game scene, so that a skill effect model of the skill X is to generate two thunderclouds, and skill generation positions of the skill X are the easternmost end (100, 0) and the westernmost end (−100, 0).

In some embodiments, the virtual joystick object may include the virtual joystick control and the preset joystick movement range. Step 104 may include the following steps:

(1) Determine a skill casting object and determining a preset skill casting range of the target skill, and obtain a current position of the skill casting object in the game picture.

The skill casting object refers to a virtual object on which the skill effect model of the game skill takes effect. The virtual object may be a role virtual object, an item virtual object, a scene virtual object, or the like. For example, a skill casting object of a game skill X is a virtual role that casts the skill in the game scene. In another example, a skill casting object of a game skill Y is another virtual role selected by a user in the game scene. In another example, a skill casting object of a game skill Z is a certain virtual item, a certain virtual site, or the like selected by the user in the game scene.

The current position of the skill casting object in the game picture refers to a position of the skill casting object in the game. For example, the skill casting object is a tree in the game scene, and a current position of the tree in a certain scene in the game is (299, 5, 41).

The preset skill casting range refers to the largest casting range of the game skill, and may be a range distance, a range radius, a range area, a range volume, or the like. The preset skill casting range may be set by a game developer, to improve gameplay and keep the game balance.

For example, if a skill casting object of a game skill "Summon thundercloud" is a certain site in a game scene specified by a user, a preset skill casting range of the game skill is a circle with a radius of 8 m.

In some embodiments, to help the user intuitively observe a region in which a skill may be cast and optimize user experience, after the step of determining a skill casting object and determining a preset skill casting range of the target skill, and obtaining a current position of the skill casting object in the game picture, the method may further include the following steps:

determining a skill generation region of the target skill in the game picture based on the preset skill casting range by using the current position of the skill casting object as a center; and displaying the skill generation region on the game picture.

The skill generation region refers to a region in which the skill effect model of the game skill may be generated in the game scene, that is, a region in which the skill generation position is located.

By using the current position of the skill casting object as the center, the skill generation region of the target skill in the game picture may be determined in various ways based on the preset skill casting range. For example, the skill generation region may be a circle, a sector, a sphere, or the like with the current position as a center of a circle and the preset skill casting range as a radius. In another example, the skill generation region may be a square, a rhombus, a pyramid, or the like with the current position as a center and the preset skill casting range as side lengths.

Figure 1E:
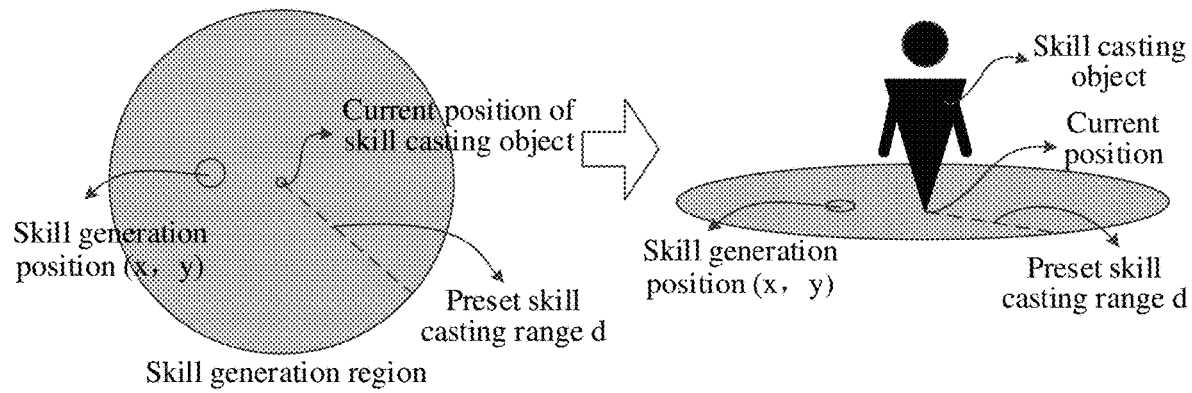
FIG. 1e is a schematic diagram of a relationship between a skill generation position and a skill generation region according to an embodiment of this application.

For example, referring to FIG. 1e, after a user has selected the target skill, the skill generation region may be displayed in the game scene. The skill generation region is a circular region with the current position of the skill casting object as a center of a circle and a preset skill casting range d as a radius. The user may control a specific position of a skill generation position (x, y) of the target skill in the skill generation region through the virtual joystick object.

In some embodiments, the skill generation region may be displayed in a highlighted form in the game scene. For example, edges of the skill generation region may be displayed in blue, and the skill generation region may be filled with gray and the filled skill generation region may be displayed.

(2) Obtain a joystick position of the virtual joystick control in the preset joystick movement range when the movement operation for the virtual joystick object is detected.

When a user performs the movement operation for the virtual joystick object, the preset joystick control is movable in a joystick movement range.

Referring to FIG. 1c, a joystick coordinate system is established by using the range center axis as the origin of the coordinate axis, and a position (x, y) of the preset joystick control in the joystick coordinate system is the joystick position.

(3) Calculate at least one skill generation position of the target skill based on the preset joystick movement range, the joystick position, the preset skill casting range, and the current position.

The joystick movement range is the largest movable casting range of the joystick. The preset skill casting range may be set by a game developer, to improve gameplay and keep the game balance.

In some embodiments, the joystick movement range is the largest movable range of the joystick, and there are many types of the range. For example, the range may be a range distance, a range radius, a range area, a range volume, or the like. The joystick movement range may be set by a game developer or adjusted by a user.

A quantity of the skill generation positions may be defined in the game skill. The skill generation position in a circular region (that is, the skill generation region) with the preset skill cast range as a radius may map the joystick position in a circular region (that is, a preset joystick movement region) with the preset joystick movement range as a radius.

In some embodiments, the step 104 of calculating at least one skill generation position of the target skill based on the preset joystick movement range, the joystick position, the preset skill casting range, and the current position may include the following steps:

A. Determine an interaction range ratio between the preset joystick movement range and the preset skill casting range.

B. Determine a relative position according to the interaction range ratio and the joystick position, the relative position being a relative position between the skill generation position and the skill casting object.

C. Determine a skill generation position of the relative position in the game picture according to the current position of the skill casting object in the game picture.

Figure 1F:
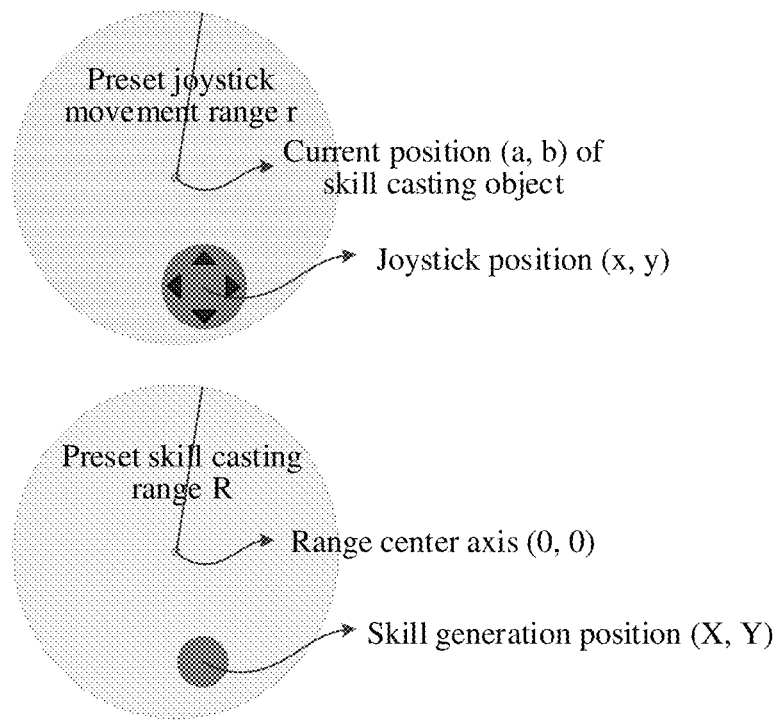
FIG. 1f is a schematic diagram of a mapping relationship between a joystick position and a skill generation position according to an embodiment of this application.

For example, referring to FIG. 1f, if the preset joystick movement range is a range with r as a radius, a user moves the preset joystick control of the virtual joystick object to a joystick position (x, y), the preset skill casting range of the target skill is a range with R as a radius, and the current position of the skill casting object is (a, b), a calculation method of a skill generation position (X, Y) is as follows:

$$d=1.25^2+3.75^2=15.625$$

where the interaction range ratio is R/r, that is, a mapping ratio between the preset joystick movement range and the preset skill casting range. The relative position includes an x-axis relative position and a y-axis relative position, the x-axis relative position being x*R/r, and the y-axis relative position being y*R/r.

In some embodiments, when the skill effect model of the target skill is generated, an effect orientation of the skill effect model may be controlled according to a relative position between the skill generation position and the skill casting object. For example, if a skill effect of a skill "Summon follower" is to summon three virtual followers, relative directions of these virtual followers are determined according to a relative position between a summoning location (that is, the skill generation position) controlled by a user and the skill casting object, so that the front of these followers are towards these relative directions.

Therefore, the step of determining the interaction range ratio and determining a relative position of the joystick position, the method may further include the following step:

calculating a relative direction of the skill effect model relative to the skill casting object according to the relative position.

For example, if the relative position is (A, B), the relative direction is arctan B/A. In another example, if the relative position is a polar coordinate ($\rho$, $\theta$), the relative direction is $\theta$.

In some embodiments, the skill effect model of the target skill may be generated at a plurality of skill generation positions. For example, the skill "Summon follower" may generate game models of three virtual followers at skill generation positions specified by a user. To further improve precision of information exchange and reduce operation complexity, this embodiment provides a concept of a skill effect model distribution trajectory. The skill generation positions of the target skill are all on the skill effect model distribution trajectory. Step C may include steps a, b, c, d, and e as follows:

a. Determine a quantity of the skill generation positions of the target skill.

b. Calculate a skill effect model distribution radius of the target skill according to the relative position.

The quantity of the skill generation positions may be preset in the game skill. For example, if a quantity of the skill generation positions of the skill "Summon follower" is three, after the skill is triggered, game models of three virtual followers may be generated at skill generation positions specified by a user.

The skill effect model distribution trajectory of the target skill may be calculated according to the skill effect model distribution radius.

The skill effect model distribution radius of the target skill may be calculated in various ways according to the relative position. For example, a farther relative position indicates a smaller skill effect model distribution radius. In another example, a closer relative position indicates a smaller skill effect model distribution radius.

In some embodiments, step b may include the following steps:

obtaining a preset coefficient;

calculating a relative distance according to the relative position; and performing weighted summation on the relative distance according to the preset coefficient, to obtain the skill effect model distribution radius of the target skill.

The calculation formula of a skill effect model distribution radius R is as follows:

$$R = K \times \sqrt{d}$$

where a preset coefficient K may be preset by a game developer, and the calculation formula of a relative distance d is as follows:

$$x^2 + y^2$$

where the relative position is (x, y).

c. Determine the skill effect model distribution trajectory of the target skill based on the skill effect model distribution radius by using the relative position as a center of a circle.

Figure 1G:
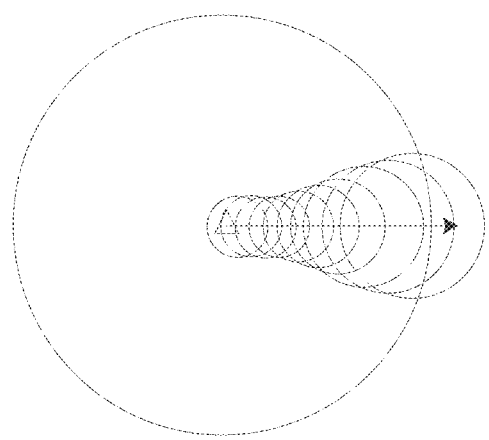
FIG. 1g is a schematic diagram showing changes of a skill effect model distribution trajectory according to an embodiment of this application.

For example, referring to FIG. 1g, a big circle is the preset skill casting range, small circles are the skill effect model distribution trajectory with the skill effect model distribution radius as a radius, and a triangle is the relative position of the skill casting object. A farther relative position (that is, a larger relative distance) indicates larger small circles.

In some embodiments, because the skill effect model of the game skill has a volume, when a game skill has a plurality of skill generation positions, it needs to be ensured that skill effect models generated at the skill generation positions do not collide or intersect with each other. Therefore, in the plurality of small circles of FIG. 1g, the leftmost four small circles keep the same size, so that when the relative position is less than a certain value, the skill effect model distribution radius of the skill effect model distribution trajectory no longer decreases. Step c may include the following steps:

obtaining a preset distribution volume of the skill effect model of the target skill;

multiplying the preset distribution volume of the skill effect model and the quantity of the skill generation positions, to obtain a minimum skill effect model distribution radius;

determining the skill effect model distribution trajectory of the target skill based on the skill effect model distribution radius by using the relative position as the center of the circle when the skill effect model distribution radius of the target skill is not less than the minimum skill effect model distribution radius; and determining the skill effect model distribution trajectory of the target skill based on the minimum skill effect model distribution radius by using the relative position as the center of the circle when the skill effect model distribution radius of the target skill is less than the minimum skill effect model distribution radius.

The preset distribution volume of the skill effect model is a game model volume of the skill effect model. For example, if a skill "Plant tree" is triggered, a game model of one virtual tree may be generated at each of four skill generation positions, and a model volume of the virtual tree is 3 m*3 m, the minimum skill effect model distribution radius is 3*4=12 m.

The skill effect model distribution trajectory of the target skill is determined based on the skill effect model distribution radius by using the relative position as the center of the circle when a skill effect model distribution radius of the skill "Plant tree" is not less than 12 m.

The skill effect model distribution trajectory of the target skill is determined based on 12 m by using the relative position as the center of the circle when the skill effect model distribution radius of the skill "Plant tree" is less than 12 m.

d. Determine a plurality of skill effect model distribution points on the skill effect model distribution trajectory based on the quantity of the skill generation positions.

The plurality of skill effect model distribution points may be determined in various ways based on the quantity of the skill generation positions. For example, the skill effect model distribution trajectory is averaged based on the quantity of the skill generation positions, and each averaged point is used as a skill effect model distribution point.

In some embodiments, when the skill effect model of the target skill is generated, an effect orientation of the skill effect model may be controlled according to a vertical direction of the skill effect model distribution points. For example, if the skill effect of the skill "Summon follower" is to summon three virtual followers, vertical directions of distribution points are defined as relative directions of these virtual followers, so that the front of these followers are towards these relative directions.

Therefore, after step d, the method may further include the following step:

determining a vertical direction of the skill effect model distribution points based on the skill effect model distribution radius.

e. Determine positions of the skill effect model distribution points in the game picture as the skill generation positions according to the current position of the skill casting object in the game picture.

For example, if the current position of the skill casting object in the game picture is (a, b), the position of a skill effect model distribution point (m, n) in the game picture, that is, the skill generation position, is (m+a, n+b).

FIG. 1b, step 105: Generate a skill effect model of the target skill at the at least one skill generation position when a cast operation performed by a user for the virtual joystick object is detected.

For example, if the skill effect of the skill "Summon follower" is to summon three virtual followers, when the cast operation performed by a user for the virtual joystick object is detected, virtual follower models are generated at three skill generation positions in the game scene.

In some embodiments, to enable the front of the skill effect model to be towards the relative direction, based on the relative direction obtained in step B of step 104, step 105 may include the following steps:

modifying a skill effect model direction of the target skill based on the relative direction when the cast operation performed by a user for the virtual joystick object is detected, to obtain a target skill whose direction is modified; and generating a skill effect model of the target skill whose direction is modified at the skill generation position.

For example, if when the skill "Summon follower" is triggered, one virtual follower model is generated, each model direction of the virtual follower model is ω, and the relative direction obtained in step B of step 104 is θ, the model direction of the virtual follower model is modified as ω+θ.

Similarly, in some embodiments, the front of the skill effect model is towards the vertical direction, and according to the vertical direction obtained in step d of step 104, step 105 may include the following steps:

modifying a skill effect model direction of the target skill based on the vertical direction when the cast operation performed by a user for the virtual joystick object is detected, to obtain a target skill whose direction is modified; and generating a skill effect model of the target skill whose direction is modified at the skill generation position.

In some embodiments, to prevent the game skill cast by the user from going beyond the skill generation region, to further improve precision of information exchange, according to the skill generation region obtained in step (1) of step 104, step 105 may include the following step:

generating the skill effect model of the target skill at the skill generation position when the skill generation position is in the skill generation region.

In some embodiments, to enable the user to intuitively observe, before casting the skill, a cast position of the target skill while controlling the virtual joystick object, and to adjust the skill generation position while observing, after step 105. the method may further include the following step:

generating a skill preview effect model of the target skill at the at least one skill generation position.

The skill preview effect model is an effect model for the user to preview. When the skill preview effect model is generated in the game scene, the game skill usually does not take effect, and when the skill effect model is generated in the game scene, the game skill takes effect formally.

By generating the skill preview effect model of the target skill, the user can master cast precision in the game.

In some embodiments, generation of the skill preview effect model of the target skill may be stopped at the at least one skill generation position when the cast operation performed by a user for the virtual joystick object is detected, and the skill effect model of the target skill is generated.

For example, if the skill effect of the game skill "Summon follower" is to summon three virtual followers around the skill casting object, the virtual followers may perform a remote attack on an enemy nearby. When the user adjusts the skill generation position by using the virtual joystick object, the skill preview effect model of the game skill, for example, a virtual image model of the virtual follower, is generated at the skill generation position. Until the user performs a cast operation, the virtual image model of the virtual follower is removed at the skill generation position, the skill effect model of the game skill, for example, a game model of the virtual follower, is generated, and the virtual follower may perform a remote attack on an enemy nearby.

It can be learned from the above that, according to the method provided in this embodiment of this application, a game picture may be displayed, the game picture including a candidate skill region; a target skill is determined based on a skill selection operation performed by a user for the candidate skill region; a virtual joystick object is displayed on the game picture; when a movement operation for the virtual joystick object is detected, at least one skill generation position of the target skill is calculated based on the movement operation; and a skill effect model of the target skill is generated at the at least one skill generation position when a cast operation performed by a user for the virtual joystick object is detected. Therefore, in this solution, a plurality of skill effect model generation positions of a game skill can be controlled by using the virtual joystick object, so that the game skill is cast more precisely, and precision of information exchange is improved.

According to the method described in the foregoing embodiments, the following further provides a detailed description.

The method according to some embodiments of this application is described further by using an example in which the information exchange method is applied to a mobile game with a smart phone as a terminal.

In the mobile game, a player may cast a game skill by operating a virtual role to fight against a rival virtual role operated by another player. In the mobile game, there are many types of game skills, for example, a summoning type and a spell type.

A game skill of the summoning type is to generate models of one or more summoning units in a game scene, and a game skill of the spell type is to generate a model having a spell effect in the game scene.

In this embodiment, a process of the information exchange method is as follows:

1. Display a game picture, the game picture including a candidate skill region.

The game picture may include the candidate skill region.

The game picture may further include role information of a virtual role of a player, for example, a nickname, a health point of the virtual role, and a gain effect of the virtual role.

The game picture may further include a battle time control. The battle time control may be configured to display a lasting time for a battle between players.

In addition, the game picture may further include a second virtual joystick object used for controlling the virtual role to move. For example, the lower left corner of the game picture may include the second virtual joystick object.

2. Determine a target skill based on a skill selection operation for the candidate skill region.

The candidate skill region may include a plurality of candidate skill controls. The candidate skill control may be a candidate skill icon.

For example, the candidate skill region may include three candidate skill icons, which are separately a skill icon of a skill "Light ball spell", a skill icon of a skill "Summoning spell: soldier", and a skill icon of a skill "Summoning spell: archer".

When the player taps the skill icon of the skill "Summoning spell: soldier", the skill "Summoning spell: soldier" is determined as the target skill; when the player taps the skill icon of the skill "Summoning spell: archer", the skill "Summoning spell: archer" is determined as the target skill; and when the player taps the skill icon of the skill "Light ball spell", the skill "Light ball spell" is determined as the target skill.

3. Display a virtual joystick object on the game picture.

In some embodiments, the game picture includes a second virtual joystick object, and the second virtual joystick object may be used for controlling the movement of the virtual role. Moreover, the game picture includes a first virtual joystick object, and the first virtual joystick object may be used for controlling the cast of the game skill.

4. Calculate, when a skill type of the target skill is the summoning type, and a dragging operation performed by a user for the virtual joystick object is detected, at least one skill generation position of the target skill based on the dragging operation.

In some embodiments, when the skill type of the target skill is the spell type, a conventional skill cast manner may be used for information exchange; and when the skill type of the target skill is the summoning type, this information exchange method is used for information exchange. Therefore, consistency of operations when the player is casting a spell skill and a summoning skill is ensured, thereby reducing operation complexity, and further improving operation precision.

In some embodiments, it is assumed that the target skill is the skill "Summoning spell: soldier", a skill effect of the skill "Summoning spell: soldier" is to summon a soldier follower unit within 7.2 m around the virtual role, and the soldier follower unit performs a melee attack on a rival virtual role nearby.

Therefore, a preset skill casting range of the skill "Summoning spell: soldier" is 7.2 m. When a current position of the virtual role of the player is (10, 10), a preset joystick movement range is 3.6 m, and the player moves the virtual joystick control to a joystick position (0.3, −0.4), the calculation manner of a skill generation position (X, Y) of the target skill based on the dragging operation is as follows:

$$X=7.2/3.6*0.3+10=0.6+10=10.6$$

$$Y=7.2/3.6*(-0.4)+10=9.2$$

Therefore, the skill generation position of the skill "Summoning spell: soldier" is (10.6, 9.2).

In some other embodiments, it is assumed that the target skill is the skill "Summoning spell: archer", a skill effect of the skill "Summoning spell: archer" is to summon three archer follower units within 10 m around the virtual role, and the archer follower units perform a remote attack on a rival virtual role nearby.

Therefore, a preset skill casting range of the skill "summoning spell: archer" is 10 m, and a quantity of the skill generation positions of the skill "summoning spell: archer" is three. When the current position of the virtual role of the player is (1, 2), the preset joystick movement range is 4 m, and the player moves the virtual joystick control to a joystick position (0.5, 1.5), the calculation manner of the skill generation position (X, Y) of the target skill based on the dragging operation is as follows:

(1) Calculate a skill effect model distribution radius of the target skill according to the relative position.

A model volume of the archer follower unit of the skill "summoning spell: archer" is 1 m*1 m. To prevent phenomena such as a model overlap and extrusion of three archer follower units caused by a skill generation position specified by the player being excessively close to the virtual role of the player, a minimum skill effect model distribution radius may be set herein as min_r=3*1 m=3 m.

First, a relative position (x, y) is calculated.

$$x = \frac{10}{4} \times 0.5 = 1.25$$

$$Y = \frac{10}{4} \times 1.5 = 3.75$$

Then, a relative distance d is calculated.

$$d=1.25^2+3.75^2=15.625$$

When a preset coefficient K equals 6, the calculation method of a skill effect model distribution radius r of the target skill according to the relative distance is as follows:

$$r=6*15.625*93.75$$

(2) Determine the skill effect model distribution trajectory of the target skill based on the skill effect model distribution radius by using the relative position as a center of a circle.

In this case, if the skill effect model distribution radius r of the target skill is not less than the minimum skill effect model distribution radius min_r, the skill effect model distribution trajectory of the target skill is determined based on the skill effect model distribution radius r=93.75 m by using a relative position (1.25, 3.75) as a center of a circle.

(3) Determine a plurality of skill effect model distribution points on the skill effect model distribution trajectory based on the quantity of the skill generation positions.

Figure 2A:
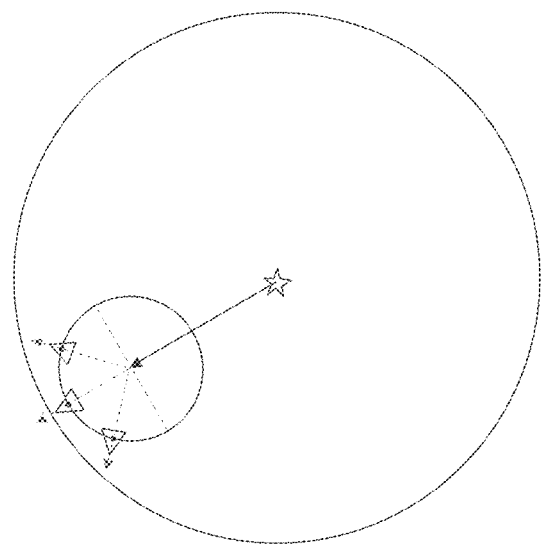
FIG. 2a is a schematic diagram of an orientation of a first skill effect model according to an embodiment of this application.
Figure 2B:
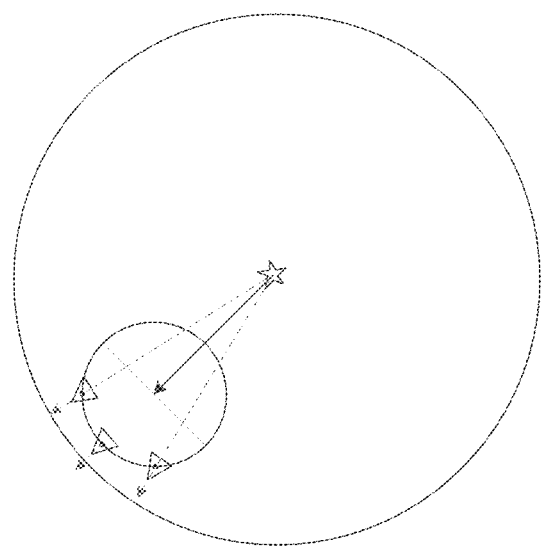
FIG. 2b is a schematic diagram of an orientation of a first skill effect model according to an embodiment of this application.

Referring to FIG. 2a and FIG. 2b, a five-pointed star represents the virtual role, a big circle is the preset skill casting range, a small circle is the skill effect model distribution trajectory, an arrow indicates a relative position (1.25, 3.75), and the skill effect model distribution trajectory is a circle with the center of the circle as (1.25, 3.75) and a radius r as 93.75.

In this embodiment, three archer follower units may be evenly distributed on a semicircle at one end relatively far away from the virtual role. That is, the semicircle of the skill effect model distribution trajectory at one end relatively far away from a current position (1, 2) is equally divided according to the quantity of the skill generation positions plus 1 (that is, quartering). The skill effect model distribution points are small black points on the skill effect model distribution trajectory.

(4) Determine positions of the skill effect model distribution points in the game picture according to the current position of the skill casting object in the game picture, to obtain the skill generation positions, and generate skill preview models of the target skill at the skill generation positions.

For example, if the skill effect model distribution points are separately (1, 1), (1.5, 0), and (1, −1), the current position of the skill casting object in the game picture is (10, 10), the skill generation positions are (10, 10), (10.5, 10), and (10, 9).

In this embodiment, the skill preview model of the skill "summoning spell: archer" is an archer follower unit preview model.

Referring to FIG. 2a, in some embodiments, the archer follower unit preview models are triangles, and orientations of the archer follower unit preview models are directions indicated by dotted arrows. That is, the orientations may be obtained by calculating the relative position and the skill generation position.

Referring to FIG. 2b, in some other embodiments, the archer follower unit preview models are triangles, and orientations of the archer follower unit preview models are directions indicated by dotted arrows. That is, the orientations may be obtained by calculating the current position and the skill generation position.

Before the skill preview models of the target skill are generated at the skill generation positions, the orientations of the skill preview models need to be modified as orientations obtained through the foregoing calculation.

(5) Generate the skill effect model of the target skill at the at least one skill generation position when a cast operation performed by a user for the virtual joystick object is detected.

Similar to the foregoing generating the skill preview models of the target skill, when the cast operation performed by a user for the virtual joystick object is detected, three archer follower unit models may be generated at the foregoing three skill generation positions according to modified orientations.

Through the foregoing method, a player may accurately cast a summoning skill by using the virtual joystick object. At the same time, the player may further cast a spell skill through a conventional wheel. In this case, the operation consistency of casting the summoning skill and the spell skill can be improved.

In addition, in this solution, when a plurality of skill effect models can be generated for a game skill, orientations and distribution densities of the skill effect models can be adjusted at the same time.

Therefore, comparisons among an operation manner of the conventional wheel, an operation manner of a dragging skill, and an operation manner in this solution are performed, and the effects are shown in Table 1.

TABLE 1

| Solution | Position | Multi-unit | Multi-unit density | Operation consistency |
|---|---|---|---|---|
| Conventional wheel | Only controlling an angle | No | No | Consistent |
| Dragging | Yes | Yes | No | Inconsistent |
| This design solution | Yes | Yes | Yes | Consistent |

It can be learned from the above that, according to this solution, a game picture may be displayed, the game picture including a candidate skill region; a target skill is determined based on a skill selection operation performed by a user for the candidate skill region; a virtual joystick object is displayed on the game picture; when a skill type of the target skill is a summoning type, and a dragging operation for the virtual joystick object is detected, at least one skill generation position of the target skill is calculated based on the dragging operation; and a skill effect model of the target skill is generated at the at least one skill generation position when a cast operation performed by a user for the virtual joystick object is detected. Therefore, in this solution, a cast position and cast direction of the game skill effect model can be controlled at the same time by using the virtual joystick object, and a cast density of the game skill effect model can be controlled automatically, thereby improving precision of information exchange while reducing operation complexity.

To better implement the foregoing method, an embodiment of this application further provides an information exchange apparatus. The information exchange apparatus may be integrated in a terminal. The terminal may be any computing device such as a smart phone, a tablet computer, an intelligent Bluetooth device, a notebook computer, a video game console, or a PC.

For example, in this embodiment, the method in this embodiment of this application is described in detail by using an example in which the information exchange apparatus is integrated in a smart phone. A smart phone is one example of an information exchange apparatus and there may be many different examples of the information exchange apparatus, such as the terminal devices described herein.

Figure 3:
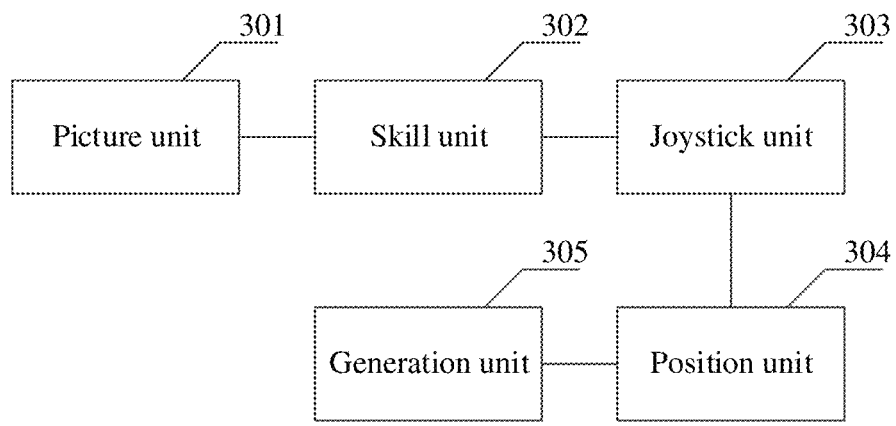
FIG. 3 is a schematic structural diagram of an information exchange apparatus according to an embodiment of this application.

For example, as shown in FIG. 3, the information exchange apparatus may include a picture unit 301, a skill unit 302, a joystick unit 303, a position unit 304, and a generation unit 305 as follows:

1. The picture unit 301:

The picture unit 301 may be configured to display a game picture, where the game picture may include a candidate skill region.

2. The skill unit 302:

The skill unit 302 may be configured to determine a target skill based on a skill selection operation for the candidate skill region.

In some embodiments, the candidate skill region includes a skill control of at least one candidate skill. The skill unit 302 may be configured to:

determine the target skill in the at least one candidate skill based on a selection operation for the skill control.

3. The joystick unit 303:

The joystick unit 303 may be configured to display a virtual joystick object on the game picture.

In some embodiments, the game picture may further include a cast cancel control. The joystick unit 303 may further be configured to:

stop displaying the virtual joystick object in the game picture when a cast cancel operation for the cast cancel control is detected.

4. The position unit 304:

The position unit 304 may be configured to calculate, when a movement operation for the virtual joystick object is detected, at least one skill generation position of the target skill based on the movement operation.

In some embodiments, the virtual joystick object may include a virtual joystick control and a preset joystick movement range. The position unit 304 may include a current-position subunit, a joystick subunit, and a position subunit as follows:

(1) The current-position subunit:

The current-position subunit may be configured to determine a skill casting object and a preset skill casting range of the target skill, and obtain a current position of the skill casting object in the game picture.

In some embodiments, the current-position subunit may further be configured to:

determine a skill generation region of the target skill in the game picture based on the preset skill casting range by using the current position of the skill casting object as a center; and display the skill generation region on the game picture.

(2) The joystick subunit:

The joystick subunit may be configured to obtain a joystick position of the virtual joystick control in the preset joystick movement range when a movement operation performed by a user for the virtual joystick object is detected.

(3) The position subunit:

The position subunit may be configured to calculate at least one skill generation position of the target skill based on the preset joystick movement range, the joystick position, the preset skill casting range, and the current position.

In some embodiments, the position subunit may include a ratio submodule, a relative position submodule, and a generation position submodule as follows:

A. The ratio submodule:

The ratio submodule may be configured to determine an interaction range ratio between the preset joystick movement range and the preset skill casting range.

B. The relative position submodule:

The relative position submodule may be configured to determine a relative position according to the interaction range ratio and the joystick position, the relative position being a relative position between the skill generation position and the skill casting object.

In some embodiments, the relative position submodule may further be configured to:

calculate a relative direction of a skill effect model according to the relative position, and generate a skill effect model of the target skill at the at least one skill generation position, including:

modify a skill effect model direction of the target skill based on the relative direction, to obtain a target skill whose direction is modified; and generate a skill effect model of the target skill whose direction is modified at the skill generation position.

C. The generation position submodule:

The generation position submodule may be configured to determine a skill generation position of the relative position in the game picture according to the current position of the skill casting object in the game picture.

In some embodiments, the generation position submodule may be configured to:

determine a quantity of the skill generation positions of the target skill;
calculate a skill effect model distribution radius of the target skill according to the relative position;
determine a skill effect model distribution trajectory of the target skill based on the skill effect model distribution radius by using the relative position as a center of a circle;
determine a plurality of skill effect model distribution points on the skill effect model distribution trajectory based on the quantity of the skill generation positions; and
determine positions of the skill effect model distribution points in the game picture as the skill generation positions according to the current position of the skill casting object in the game picture.

5. The generation unit 305:

The generation unit 305 may be configured to generate the skill effect model of the target skill at the at least one skill generation position when a cast operation performed by a user for the virtual joystick object is detected.

In some embodiments, the generation unit 305 may be configured to:
overlay-display the virtual joystick object on a skill control of the target skill.

In some embodiments, the generation unit 305 may be configured to:
generate the skill effect model of the target skill at the skill generation position when the skill generation position is in the skill generation region.

In some embodiments, the generation unit 305 may be configured to:
stop generating a skill preview effect model of the target skill at the at least one skill generation position when a cast operation performed by a user for the virtual joystick object is detected, and generate the skill effect model of the target skill.

In some embodiments, the generation unit 305 may further be configured to:
generate a skill preview effect model of the target skill at the at least one skill generation position.

During one implementation, the foregoing units may be generated as independent entities, or may be differently combined, or may be generated as one same entity or several entities. For a specific implementation of the foregoing units, reference may be made to the foregoing embodiments rather than being described herein again.

According to the information exchange apparatus embodiments described herein, a game picture may be displayed by a picture unit, the game picture including a candidate skill region; a target skill is determined by a skill unit based on a skill selection operation performed by a user for the candidate skill region; a virtual joystick object is displayed on the game picture by a joystick unit; when a movement operation for the virtual joystick object is detected, at least one skill generation position of the target skill is calculated by a position unit based on the movement operation; and a skill effect model of the target skill is generated at the at least one skill generation position by a generation unit when a cast operation performed by a user for the virtual joystick object is detected. Therefore, the solution can improve precision of information exchange.

An embodiment of this application further provides a terminal. The terminal may be a device such as a mobile phone, a tablet computer, an intelligent Bluetooth device, a notebook computer, a video game console, or a PC.

In some embodiments, the terminal may be a node in a distributed system. The distributed system may be a blockchain system. The blockchain system may be a distributed system formed by connecting a plurality of the nodes through network communication. A peer to peer (P2P) network may be formed between the nodes. A computing device in any form, for example, an electronic device such as a server or a terminal, may become a node in the blockchain system by joining the P2P network.

Figure 4:
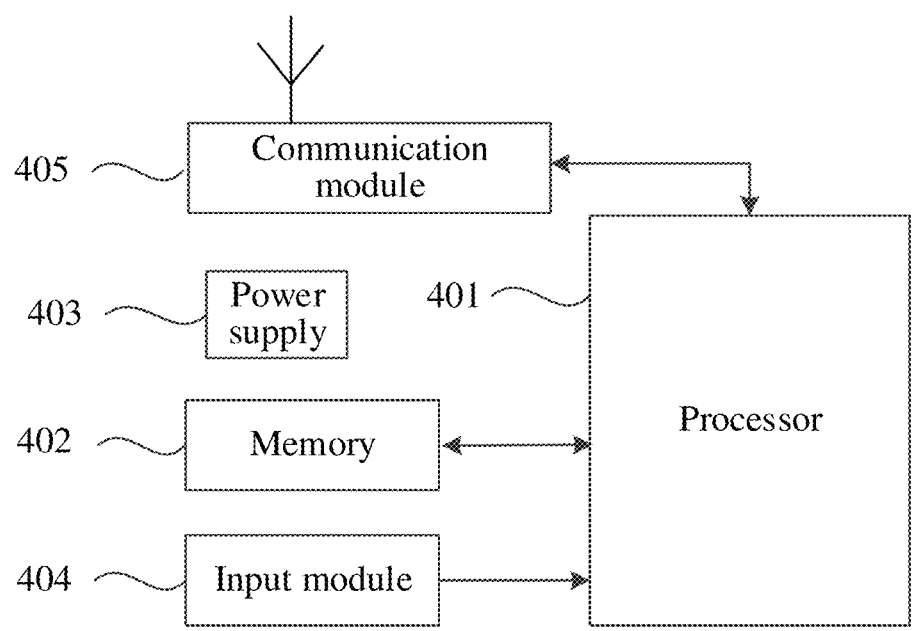
FIG. 4 is a schematic structural diagram of a network device according to an embodiment of this application.

A smart phone or mobile phone is used just one example of the terminal according to one embodiment. In other embodiments, there may be other examples of the terminal different from the smart phone, despite the smart phone being used as a primary example in the description above. For example, FIG. 4 is a schematic structural diagram of a terminal according to just one embodiment of this application.

The terminal may include components such as a processor 401 including one or more processing cores, a memory 402 including one or more computer-readable storage media, a power supply 403, an input module 404, and a communication module 405. A person skilled in the art would understand that the terminal structure shown in FIG. 4 is merely one example, and may include more or fewer components than those shown in the figure, some components may be combined, or there may be different component arrangements.

The processor 401 is a control center of the terminal, and connects to various parts of the terminal by using various interfaces and lines. By running or executing the software program and/or module stored in the memory 402, and invoking data stored in the memory 402, the processor performs various functions the terminal and processes data, thereby performing overall monitoring on the terminal. In some embodiments, the processor 401 may include the one or more processing cores. In some embodiments, the processor 401 may integrate an application processor and a modem processor. The application processor mainly processes an operating system, a UI, an application program, and the like. The modem processor mainly processes wireless communication. It can be understood that the foregoing modem processor may alternatively not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (for example, a sound playback function and an image display function), and the like. The data storage area may store data created according to use of the terminal, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The terminal further includes the power supply 403 for supplying power to the components. In some embodiments, the power supply 403 may be logically connected to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The terminal may further include an input unit 404. The input unit 404 may be configured to receive inputted digit or character information, and generate a keyboard, mouse, joystick, optical or track ball signal input related to the user setting and function control.

The terminal may further include the communication module 405. In some embodiments, the communication module 405 may include a wireless module. The terminal may perform a short distance wireless transmission through the wireless module of the communication module 405, to provide wireless broadband Internet access for the user. For example, the communication module 405 may be configured to help a user to receive and send an email, browse a web page, access streaming media, and the like.

Although not shown in the figure, the terminal may further include a display unit, and the like as described above. In some embodiments, the processor 401 in the terminal may load executable files corresponding to processes of one or more application programs to the memory 402 according to the following instructions, and the processor 401 runs the application programs stored in the memory 402 to generate various functions as follows:

displaying a game picture, the game picture including a candidate skill region;

determining a target skill based on a skill selection operation for the candidate skill region;

displaying a virtual joystick object on the game picture;

calculating, when a movement operation for the virtual joystick object is detected, at least one skill generation position of the target skill based on the movement operation; and generating a skill effect model of the target skill at the at least one skill generation position when a cast operation for the virtual joystick object is detected.

For specific implementation of the foregoing operations, reference may be made to the foregoing embodiments described above.

A person of ordinary skill in the art may understand that, all or some steps of the methods of the foregoing embodiments may be implemented through instructions, or implemented through instructions controlling relevant hardware, and the instructions may be stored in a computer-readable storage medium that are loaded and executed by a processor.

Another embodiment of this application further provides a storage medium, the storage medium being configured to store a computer program, the computer program being configured to perform the method according to the above embodiments. For example, the instructions may perform the following steps:

displaying a game picture, the game picture including a candidate skill region;

determining a target skill based on a skill selection operation for the candidate skill region;

displaying a virtual joystick object on the game picture;

calculating, when a movement operation for the virtual joystick object is detected, at least one skill generation position of the target skill based on the movement operation; and generating a skill effect model of the target skill at the at least one skill generation position when a cast operation for the virtual joystick object is detected.

The storage medium may include: a read-only memory (ROM), a random access memory (RAM), a magnetic disk, an optical disc or the like.

Because the instructions stored in the storage medium may perform the steps of any information exchange method according to the embodiments of this application, the instructions can implement beneficial effects that may be implemented by any information exchange method in the embodiments of this application described herein.

An embodiment of this application further provides a computer program product including instructions, the computer program product, when run on a computer, causing the computer to perform the method according to the foregoing embodiments.

The information exchange method and apparatus, the terminal, and the computer-readable storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. A method performed by a terminal, the method comprising:

displaying a game picture on a display, the game picture comprising a candidate skill region;

determining a target skill based on a skill selection operation for the candidate skill region;

displaying a virtual joystick object in the game picture on the display, wherein the virtual joystick object comprises a virtual joystick control and a preset joystick movement range; and calculating, in response to detecting a movement operation for the virtual joystick object, at least one skill effect model distribution trajectory of the target skill based on the movement operation, wherein the at least one skill effect model distribution trajectory of the target skill comprises a plurality of skill generation positions, and wherein the calculating comprises:

determining a skill casting object and a preset skill casting range of the target skill;

obtaining a current position of the skill casting object in the game picture;

obtaining a joystick position of the virtual joystick control in the preset joystick movement range in response to detecting the movement operation for the virtual joystick object;

determining an interaction range ratio between the preset joystick movement range and the preset skill casting range;

determining a relative position according to the interaction range ratio and the joystick position, the relative position being a relative position between the skill effect model distribution trajectory of the target skill and the skill casting object;

determining the skill effect model distribution trajectory in the game picture according to the relative position and the current position of the skill casting object in the game picture;

determining the plurality of skill generation positions based on the skill effect model distribution trajectory of the relative position in the game picture; and generating a skill effect model of the target skill at the plurality of skill generation positions in the game picture on the display in response to detecting a cast operation for the virtual joystick object.

2. The method according to claim 1, wherein determining the skill effect model distribution trajectory in the game picture according to the relative position and the current position of the skill casting object in the game picture comprises:

determining a quantity of skill generation positions of the target skill;

calculating a skill effect model distribution radius of the target skill according to the relative position;

determining the skill effect model distribution trajectory of the target skill based on the skill effect model distribution radius by using the relative position as a center of a circle;

determining the plurality of skill generation positions on the skill effect model distribution trajectory based on the quantity of skill generation positions of the target skill; and determining positions of the plurality of skill generation positions in the game picture on the display as the plurality of skill generation positions according to the current position of the skill casting object in the game picture.

3. The method according to claim 1, wherein after the determining a skill casting object of the target skill and a preset skill casting range, and obtaining a current position of the skill casting object in the game picture, the method further comprises:

determining a skill generation region of the target skill in the game picture based on the preset skill casting range by using the current position of the skill casting object as a center; and displaying the skill generation region in the game picture on the display;

wherein the generating a skill effect model of the target skill at the plurality of skill generation positions comprises:

generating a skill effect model of the target skill at the plurality of skill generation positions when the plurality of skill generation positions are in the skill generation region.

4. The method according to claim 2, wherein after the determining a plurality of skill generation positions on the skill effect model distribution trajectory based on the quantity of skill generation positions of the target skill, the method further comprises:

determining a vertical direction of the plurality of skill generation positions based on the skill effect model distribution radius; and wherein the generating a skill effect model of the target skill at the plurality of skill generation positions comprises:

modifying a skill effect model direction of the target skill based on the vertical direction, so as to obtain a target skill whose direction is modified; and generating a skill effect model of the target skill whose direction is modified at the plurality of skill generation positions.

5. The method according to claim 2, wherein the calculating a skill effect model distribution radius of the target skill according to the relative position comprises:

obtaining a preset coefficient;

calculating a relative distance according to the relative position; and performing weighted summation on the relative distance according to the preset coefficient, to obtain the skill effect model distribution radius of the target skill.

6. The method according to claim 2, wherein the determining a skill effect model distribution trajectory of the target skill based on the skill effect model distribution radius by using the relative position as a center of a circle comprises:

obtaining a preset distribution volume of the skill effect model of the target skill;

multiplying the preset distribution volume of the skill effect model and quantity of skill generation positions of the target skill, to obtain a minimum skill effect model distribution radius;

determining the skill effect model distribution trajectory of the target skill based on the skill effect model distribution radius by using the relative position as the center of the circle when the skill effect model distribution radius of the target skill is not less than the minimum skill effect model distribution radius; and determining the skill effect model distribution trajectory of the target skill based on the minimum skill effect model distribution radius by using the relative position as the center of the circle when the skill effect model distribution radius of the target skill is less than the minimum skill effect model distribution radius.

7. The method according to claim 1, wherein after the calculating, in response to detecting a movement operation for the virtual joystick object, the plurality of skill generation positions of the target skill based on the movement operation, the method further comprises generating a skill preview effect model of the target skill at the plurality of skill generation positions.

8. The method according to claim 7, wherein after the calculating, in response to detecting a movement operation for the virtual joystick object, the plurality of skill generation positions of the target skill based on the movement operation, the method further comprises:

stopping generating the skill preview effect model of the target skill at the plurality of skill generation positions in response to detecting the cast operation performed by a user for the virtual joystick object.

9. The method according to claim 7, wherein the method further comprises:

displaying in the game picture on the display a cast cancel control; and stopping generating the skill preview effect model of the target skill at the plurality of skill generation positions in response to detecting a cast control cancellation input via the cast cancel control.

10. The method according to claim 1, wherein the candidate skill region comprises a skill control of at least one candidate skill, and the determining a target skill based on a skill selection operation for the candidate skill region comprises:

determining the target skill in the at least one candidate skill based on a selection operation for the skill control; and wherein displaying a virtual joystick object in the game picture on the display comprises:

overlay-displaying the virtual joystick object on the skill control of the target skill.

11. The method according to claim 1, wherein the method further comprises:

displaying in the game picture on the display a cast cancel control; and
stopping displaying the virtual joystick object in the game picture on the display in response to detecting a cast cancel operation.

12. An apparatus, comprising:
a memory storing a plurality of instructions; and
a processor being configured to execute the plurality of instructions and to:
  display a game picture on a touchscreen display connected to the processor, the game picture comprising a candidate skill region;
  determine a target skill based on a skill selection operation for the candidate skill region;
  display a virtual joystick object in the game picture on the touchscreen display, wherein the virtual joystick object comprises a virtual joystick control and a preset joystick movement range; and
  calculate, in response to detecting a movement operation for the virtual joystick object, at least one skill effect model distribution trajectory of the target skill based on the movement operation, wherein the at least one skill effect model distribution trajectory of the target skill comprises a plurality of skill generation positions, and wherein, when the processor is configured to calculate at least one skill effect model distribution trajectory of the target skill based on the movement operation, the processor is further configured to:
    determine a skill casting object and a preset skill casting range of the target skill;
    obtain a current position of the skill casting object in the game picture;
    obtain a joystick position of the virtual joystick control in the preset joystick movement range in response to detecting the movement operation for the virtual joystick object;
    determine an interaction range ratio between the preset joystick movement range and the preset skill casting range;
    determine a relative position according to the interaction range ratio and the joystick position, the relative position being a relative position between the skill effect model distribution trajectory of the target skill and the skill casting object;
    determine the skill effect model distribution trajectory in the game picture according to the relative position and the current position of the skill casting object in the game picture;
    determine the plurality of skill generation positions based on the skill effect model distribution trajectory of the relative position in the game picture; and
    generate a skill effect model of the target skill at the plurality of skill generation positions in the game picture on the touchscreen display in response to detecting a cast operation for the virtual joystick object.

13. The apparatus of claim 12, wherein, when the processor is configured to determine the skill effect model distribution trajectory in the game picture according to the relative position and the current position of the skill casting object in the game picture, the processor is further configured to:
  determine a quantity of skill generation positions of the target skill;
  calculate a skill effect model distribution radius of the target skill according to the relative position;
  determine the skill effect model distribution trajectory of the target skill based on the skill effect model distribution radius by using the relative position as a center of a circle;
  determine the plurality of skill generation positions on the skill effect model distribution trajectory based on the quantity of skill generation positions of the target skill; and
  determine positions of the plurality of skill generation positions in the game picture as the plurality of skill generation positions according to the current position of the skill casting object in the game picture.

14. The apparatus of claim 12, wherein after the processor is configured to determine a skill casting object of the target skill and a preset skill casting range and obtain a current position of the skill casting object in the game picture, the processor is further configured to:
  determine a skill generation region of the target skill in the game picture based on the preset skill casting range by using the current position of the skill casting object as a center; and
  display the skill generation region in the game picture on the touchscreen display;
  wherein, when the processor is configured to generate a skill effect model of the target skill at the plurality of skill generation positions, the processor is further configured to:
    generate a skill effect model of the target skill at the plurality of skill generation positions in the game picture on the touchscreen display when the plurality of skill generation positions are in the skill generation region.

15. The apparatus of claim 13, wherein after the processor is configured to determine a plurality of skill generation positions on the skill effect model distribution trajectory based on the quantity of skill generation positions of the target skill, the processor is further configured to:
  determine a vertical direction of the plurality of skill generation positions based on the skill effect model distribution radius; and wherein
  the generating a skill effect model of the target skill at the plurality of skill generation positions comprises:
    modify a skill effect model direction of the target skill based on the vertical direction, so as to obtain a target skill whose direction is modified; and
    generate a skill effect model of the target skill whose direction is modified at the plurality of skill generation positions.

16. The apparatus of claim 13, wherein, when the processor is configured to calculate a skill effect model distribution radius of the target skill according to the relative position, the processor is further configured to:
  obtaining a preset coefficient;
  calculating a relative distance according to the relative position; and
  performing weighted summation on the relative distance according to the preset coefficient, to obtain the skill effect model distribution radius of the target skill.

17. The apparatus of claim 13, wherein, when the processor is configured to determine a skill effect model distribution trajectory of the target skill based on the skill effect model distribution radius by using the relative position as a center of a circle, the processor is further configured to:
  obtain a preset distribution volume of the skill effect model of the target skill;

multiply the preset distribution volume of the skill effect model and quantity of skill generation positions of the target skill, to obtain a minimum skill effect model distribution radius;

determine the skill effect model distribution trajectory of the target skill based on the skill effect model distribution radius by using the relative position as the center of the circle when the skill effect model distribution radius of the target skill is not less than the minimum skill effect model distribution radius; and determine the skill effect model distribution trajectory of the target skill based on the minimum skill effect model distribution radius by using the relative position as the center of the circle when the skill effect model distribution radius of the target skill is less than the minimum skill effect model distribution radius.

18. The apparatus of claim 12, wherein after the processor is configured to calculate the plurality of skill generation positions of the target skill based on the movement operation, the processor is further configured to generate a skill preview effect model of the target skill at the plurality of skill generation positions; and wherein after the processor is configured to calculate the plurality of skill generation positions of the target skill based on the movement operation, the processor is further configured to stop generating the skill preview effect model of the target skill at the plurality of skill generation positions when the cast operation performed by a user for the virtual joystick object is detected.

19. The apparatus of claim 12, wherein the candidate skill region comprises a skill control of at least one candidate skill, and, when the processor is configured to determine a target skill based on a skill selection operation for the candidate skill region, the processor is further configured to:

determine the target skill in the at least one candidate skill based on a selection operation for the skill control; and wherein when the processor is configured to display a virtual joystick object in the game picture on the touchscreen display, the processor is configured to further:

overlay-display the virtual joystick object on the skill control of the target skill.

20. A non-transitory computer readable medium comprising a plurality of processor-executable instructions that, when executed by a processor, causes the processor to:

display a game picture on a display, the game picture comprising a candidate skill region;

determine a target skill based on a skill selection operation for the candidate skill region;

display a virtual joystick object in the game picture on the display, wherein the virtual joystick object comprises a virtual joystick control and a preset joystick movement range; and calculate, in response to detecting a movement operation for the virtual joystick object, at least one skill effect model distribution trajectory of the target skill based on the movement operation, wherein the at least one skill effect model distribution trajectory of the target skill comprises a plurality of skill generation positions, and wherein, when the processor is configured to calculate at least one skill effect model distribution trajectory of the target skill based on the movement operation, the processor is further configured to:

determine a skill casting object and a preset skill casting range of the target skill;

obtain a current position of the skill casting object in the game picture;

obtain a joystick position of the virtual joystick control in the preset joystick movement range in response to detecting the movement operation for the virtual joystick object;

determine an interaction range ratio between the preset joystick movement range and the preset skill casting range;

determine a relative position according to the interaction range ratio and the joystick position, the relative position being a relative position between the skill effect model distribution trajectory of the target skill and the skill casting object;

determine the skill effect model distribution trajectory in the game picture according to the relative position and the current position of the skill casting object in the game picture;

determine the plurality of skill generation positions based on the skill effect model distribution trajectory of the relative position in the game picture; and generate a skill effect model of the target skill at the plurality of skill generation positions in the game picture on the display in response to detecting a cast operation for the virtual joystick object.

* * * * *